Apr. 24, 1923.
L. DOSTAL
PEDESTAL
1,453,239
Filed May 15, 1920
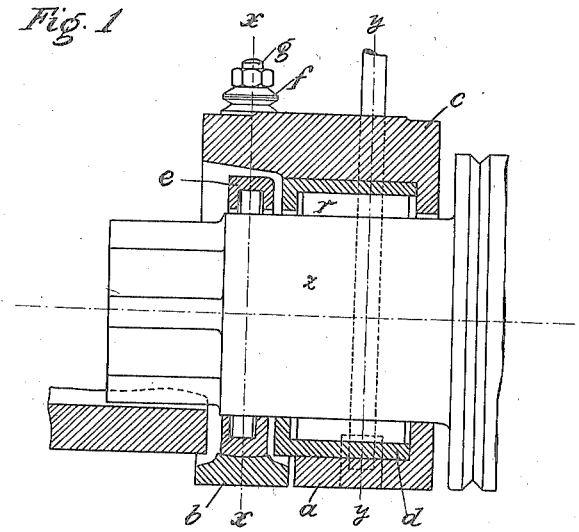
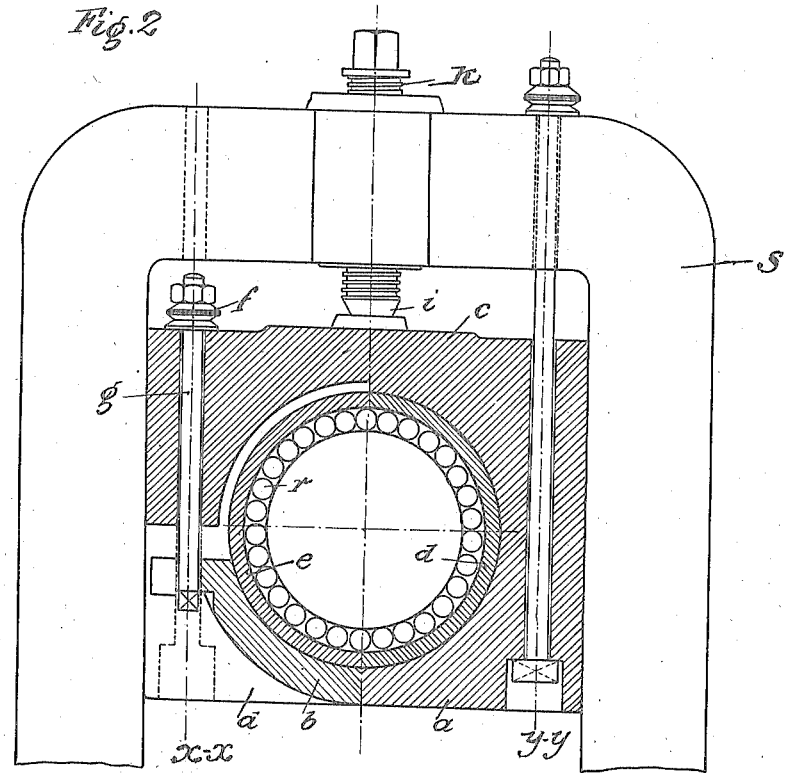
Inventor
L. Dostal
By H. R. Kerslake
Atty.

Patented Apr. 24, 1923.

1,453,239

UNITED STATES PATENT OFFICE.

LEO DOSTAL, OF KLADNO, CZECHOSLOVAKIA.

PEDESTAL.

Application filed May 15, 1920. Serial No. 381,736.

*To all whom it may concern:*

Be it known that I, LEO DOSTAL, residing at Kladno, in the country of Bohemia and State of Czechoslovakia, have invented certain new and useful Improvements in Pedestals (for which I have filed applications in Germany, June 19, 1918, Patent No. 321,989; Austria, June 17, 1918, Patent No. 81,024; France, June 1, 1920; Patent No. 516,227; Luxemburg, April 25, 1920, Patent No. 11,726; Sweden, April 22, 1920; Norway May 27, 1920; Belgium April 28, 1920; England, April 30, 1920; Czechoslovakia, April 13, 1920), of which the following is a specification.

This invention has for its object to provide an improved bearing which is adapted to take strains acting alternately in varying radial directions and to provide a bearing support without any "play."

Such bearings are required frequently and more particularly in rolling mills for the top roll in order that the latter shall not drop on to the lower bearing surface between the passes, and shoot up again when the rolling of material begins afresh.

For this reason hangers have been used hitherto in rolling mills, and have been adapted to be pressed against the roll necks by means of special screws with a predetermined initial strain in erection that is at least equal to the pressure component due to the weight of the top roll and also satisfies the requirement that it shall diminish what is known as the "spring" of the roll caused by elastic deformation.

According to the present invention the improved bearing is divided into two or more bearing rings located side by side in the axial direction, and each of these bearing rings is stressed solely in one of the directions of action of the forces, while however having any desired amount of play (which may also be spring-controlled) in other directions of the forces. In this manner, in the above-mentioned example of the bearing of the top roll of a rolling mill, one ring takes exclusively the downwardly acting force due to the weight, whereas the other ring takes exclusively the upwardly directed rolling strains.

A bearing according to this invention constructed by way of example as a top bearing of a rolling mill is illustrated in the accompanying drawings, in which:—

Figure 1 is a longitudinal section, and
Figure 2 is a vertical cross-section on the lines $x$—$x$ and $y$—$y$ of Figure 1.

The entire bearing for the neck $z$ of the top roll is divided into a part bearing $a$ and a part bearing $b$. These two part bearings are located in a common housing $c$. The two bearing rings $d$ and $e$ are made separate, so that they can move independently and relatively to each other.

The part bearing $a$ (right-hand half of Figure 2) in which the bearing ring $d$ is mounted, takes the upwardly directed rolling strains, whereas the part bearing $b$ (left-hand half of Figure 2) supports the weight of the roll. The bearing ring $e$ which contains the rollers $r$ in the part bearing $b$ is supported by the latter, which is hung from the housing $c$ by means of the housing screws $g$ with, if desired, the interposition of springs $f$.

In view of the resulting bending moments the part bearing $a$ that takes the main strains is arranged nearer to the root or inner end of the roll neck, whereas the part $b$ is arranged outwardly thereof nearer to the free end of the said neck. This arrangement may, however, be reversed. The part bearing $b$ may also be arranged at any other point, for instance by interrupting or subdividing the part bearing $a$.

The entire roll bearing is hung in the roll frame $s$, and finds its abutment in the press screw $k$ through the medium of a pressure block $i$ during rolling operations.

In all these constructional forms it is immaterial whether the roll bearing is designed as a sliding-friction bearing, or as a ball or roller bearing, a bearing of the roller type having been shown in the drawing by way of example.

Having now described my invention, what I claim as new and desire to secure by Letters Patent is:—

A bearing for rolling mills for taking a plurality of strains acting alternately in varying radial directions comprising a plurality of bearing rings arranged axially side by side, and supporting means for the bearing means, one of the said rings being resiliently mounted in such a manner as to keep the periphery of the neck of the roller in contact with the inner surface of the bearing member when there is a wear between the neck and the bearing, as set forth.

In testimony whereof I affix my signature in presence of two witnesses.

LEO DOSTAL.

Witnesses:
  KAREL ŠŮHA,
  JOSEPH PIA.